United States Patent
Dong et al.

(10) Patent No.: US 10,221,086 B2
(45) Date of Patent: Mar. 5, 2019

(54) LASER DRILLING METHOD AND LASER DRILLING SYSTEM

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Dai Dong, Beijing (CN); Weigang Gong, Beijing (CN); Yang Huang, Beijing (CN); Sheng Tao, Beijing (CN)

(73) Assignees: BOE TECHNOLOGY GROUP CO., LTD. (CN); HEFEI XINSHENG OPTOELECTRONICS TECHNOLOGY CO., LTD. (CN)

( * ) Notice: Subject to any disclaimer, the term of this patent is extended or adjusted under 35 U.S.C. 154(b) by 143 days.

(21) Appl. No.: 14/437,027

(22) PCT Filed: Sep. 30, 2014

(86) PCT No.: PCT/CN2014/087917
§ 371 (c)(1),
(2) Date: Apr. 20, 2015

(87) PCT Pub. No.: WO2015/103893
PCT Pub. Date: Jul. 16, 2015

(65) Prior Publication Data
US 2016/0304386 A1   Oct. 20, 2016

(30) Foreign Application Priority Data

Jan. 10, 2014 (CN) .......................... 2014 1 0013225
Feb. 20, 2014 (CN) .......................... 2014 1 0058041

(51) Int. Cl.
*C03B 33/09* (2006.01)
*C03B 33/02* (2006.01)
(Continued)

(52) U.S. Cl.
CPC .......... *C03B 33/091* (2013.01); *B23K 26/032* (2013.01); *B23K 26/0622* (2015.10);
(Continued)

(58) Field of Classification Search
None
See application file for complete search history.

(56) References Cited

U.S. PATENT DOCUMENTS 4,473,737 A    9/1984 Anthony
2003/0052098 A1*  3/2003 Kim .................. B23K 26/0736
                                                  219/121.68
(Continued)

FOREIGN PATENT DOCUMENTS

CN    1203202    12/1998
CN    1414893    4/2003
(Continued)

OTHER PUBLICATIONS

Machine translation of KR101433627B1 performed by Google Patents Jan. 27, 2017, 17 pages.*
(Continued)

*Primary Examiner* — Lisa L Herring
(74) *Attorney, Agent, or Firm* — Brooks Kushman P.C.

(57) ABSTRACT

The present disclosure provides a laser drilling method and a laser drilling system. The laser drilling method includes a hole-boundary formation step of outputting a pulse laser beam and scanning a substrate to be drilled, to form a boundary cutting groove of a preformed hole; a material-in-hole heating step of outputting a $CO_2$ laser beam, aligning the $CO_2$ laser beam with the preformed hole, and heating a substrate material of the preformed hole for a predetermined period of time; and a hole formation step of cooling the substrate material of the preformed hole, to deform the (Continued)

substrate material and enable the substrate material to fall off from the substrate to be drilled.

11 Claims, 3 Drawing Sheets

(51) Int. Cl.
    *B23K 26/03*         (2006.01)
    *B23K 26/142*     (2014.01)
    *B23K 26/388*     (2014.01)
    *B23K 26/70*        (2014.01)
    *C03B 33/04*       (2006.01)
    *B23K 26/382*     (2014.01)
    *B23K 26/40*        (2014.01)
    *B23K 26/402*     (2014.01)
    *B23K 26/0622*    (2014.01)
    *B23K 103/00*     (2006.01)

(52) U.S. Cl.
    CPC .......... *B23K 26/142* (2015.10); *B23K 26/388* (2013.01); *B23K 26/389* (2015.10); *B23K 26/40* (2013.01); *B23K 26/402* (2013.01); *B23K 26/703* (2015.10); *C03B 33/0222* (2013.01); *C03B 33/04* (2013.01); *B23K 2103/00* (2018.08); *B23K 2103/42* (2018.08); *B23K 2103/54* (2018.08)

(56) References Cited

U.S. PATENT DOCUMENTS

| | | | | |
|---|---|---|---|---|
| 2006/0169677 | A1* | 8/2006 | Deshi | B23K 26/032 219/121.7 |
| 2009/0032505 | A1* | 2/2009 | Huang | B23K 26/38 219/121.67 |
| 2009/0040640 | A1 | 2/2009 | Kim et al. | |
| 2009/0162606 | A1* | 6/2009 | Hsu | B28D 1/00 428/131 |
| 2010/0243627 | A1* | 9/2010 | Lee | C03B 33/0222 219/121.72 |
| 2015/0136743 | A1* | 5/2015 | Hosseini | B23K 26/364 219/121.61 |
| 2015/0140735 | A1* | 5/2015 | Hosseini | B81C 1/00634 438/107 |
| 2015/0165560 | A1* | 6/2015 | Hackert | C03B 33/082 428/43 |
| 2015/0352666 | A1* | 12/2015 | Fujita | B23K 26/14 219/121.61 |
| 2015/0367442 | A1* | 12/2015 | Bovatsek | B23K 26/0057 65/112 |
| 2016/0280580 | A1* | 9/2016 | Bohme | B23K 26/38 |

FOREIGN PATENT DOCUMENTS

| | | | | |
|---|---|---|---|---|
| CN | 1762642 | | 4/2006 | |
| CN | 101018746 | | 8/2007 | |
| CN | 101134263 | | 3/2008 | |
| CN | 101462822 | | 6/2009 | |
| CN | 101765474 | | 6/2010 | |
| CN | 202297372 | | 7/2012 | |
| CN | 102814591 | | 12/2012 | |
| CN | 103831539 | | 6/2014 | |
| DE | 102011004117 | A1 * | 8/2012 | ........... B23K 26/032 |
| JP | 2001015786 | | 1/2001 | |
| JP | 4582938 | | 11/2010 | |
| KR | 101433627 | B1 * | 8/2014 | ............. A61K 9/703 |

OTHER PUBLICATIONS

DE102011004117A1 Machine Translation Performed by Google Patents May 16, 2017.*
Lundin, "Focusing on tube cutting lasers", The Tube and Pipe Journal Oct./Nov. 2002, 6 pages, Nov. 2002.*
Office Action in Chinese Patent Application No. 201410058041.6, dated Jul. 21, 2015.
First Office Action issued in corresponding Chinese Application No. 2014100580416 dated Mar. 17, 2015.
International Search Report and Written Opinion issued in corresponding International Application No. PCT/CN2014/087917 dated Jan. 6, 2015.

* cited by examiner

LASER DRILLING METHOD AND LASER DRILLING SYSTEM

CROSS-REFERENCE TO RELATED APPLICATIONS

The present application is the U.S. National Phase of International Patent Application No. PCT/CN2014/087917, filed on Sep. 30, 2014 which claims priorities to Chinese patent application No. 201410013225.0 filed on Jan. 10, 2014 and the Chinese patent application No. 201410058041.6 filed on Feb. 20, 2014, which are incorporated herein by reference in their entireties.

TECHNICAL FIELD

The present disclosure relates to the field of laser machining technology, in particular to a laser drilling method and a laser drilling system.

BACKGROUND

Laser drilling refers to a laser machining procedure for forming a hole by heating a material with focused laser beams as a high-intensity heat source so as to melt or vaporize and then evaporate the material at a region irradiated by the laser beams. Currently, a $CO_2$ continuous-wave (CW) laser beam is used in an existing laser drilling technique. FIG. 1 shows its operating principle, where a $CO_2$ laser 1 outputs CW laser beams which are focused at a high temperature at a peripheral region on a substrate 2 where holes are desired to be drilled, so as to melt the material, thereby to drill the holes.

However, when the holes are drilled using the $CO_2$ CW laser beams, some substrates, e.g., a glass substrate with ultrahigh chemical strength, are readily to crack, so the $CO_2$ CW laser beams are mainly used for drilling holes in the glass substrate which is not chemically reinforced, rather than the glass substrate with ultrahigh chemical strength. In addition, generally the holes formed by the $CO_2$ CW laser beams have poor surface quality, and a residual or dummy material cannot fall off from the substrate automatically.

SUMMARY

An object of the present disclosure is to provide a laser drilling method and a laser drilling system, so as to be adapted to a substrate with ultrahigh chemical strength and to improve the surface quality of holes.

The present disclosure provides a laser drilling method, including:

a hole-boundary formation step of outputting a pulse laser beam and scanning a substrate to be drilled, so as to form a boundary cutting groove of a preformed hole;

a material-in-hole heating step of outputting a $CO_2$ laser beam, aligning the $CO_2$ laser beam with the preformed hole, and heating a substrate material of the preformed hole for a predetermined period of time; and a hole formation step of cooling the substrate material of the preformed hole, so as to deform the substrate material and enable the substrate material to fall off from the substrate to be drilled.

Alternatively, in the hole-boundary formation step of outputting the pulse laser beam and scanning the substrate to be drilled, the pulse laser beam is angled at a predetermined angle relative to a line normal to the substrate to be drilled.

Alternatively, during the execution of the step of outputting the pulse laser beam and scanning the substrate to be drilled, the step of outputting the $CO_2$ laser beam and heating the substrate material of the preformed hole for the predetermined period of time, and the step of cooling the substrate material of the preformed hole, the method further includes:

a powder discharging step of discharging, at a surface of the substrate to be drilled, a powder generated during a cutting procedure by blowing air to or in-taking air from the boundary cutting groove via a nozzle.

Alternatively, in the step of blowing air to or in-taking air from the boundary cutting groove, a plurality of nozzles is arranged at a regular interval around the boundary cutting groove.

Alternatively, the method further includes:

a hole detection step of outputting a pulse laser beam, aligning the pulse laser beam with the preformed hole, judging whether or not there is a spark caused when the substrate material is being burnt from the preformed hole, if yes, determining that the substrate material has not fallen off from the substrate, and if no, determining that the substrate material has fallen off from the substrate.

Alternatively, when one preformed hole is formed by the hole-boundary formation step, the material-in-hole heating step and the hole formation step, the hole detection step is performed on the preformed hole.

Alternatively, when it is determined that the substrate material has not fallen off from the substrate, the method further includes:

outputting a pulse laser beam and scanning the boundary cutting groove again;

outputting a $CO_2$ laser beam, aligning the $CO_2$ laser beam with the preformed hole, and heating the substrate material of the preformed hole again for a predetermined period of time; and cooling the substrate material of the preformed hole again.

Alternatively, in the material-in-hole heating step, the $CO_2$ laser beam is aligned with a center of the preformed hole.

Alternatively, the hole formation step of cooling the substrate material of the preformed hole includes feeding a low-temperature gas or liquid to the substrate material of the preformed hole.

Alternatively, the low-temperature gas is nitrogen.

Alternatively, in the hole formation step, the powder generated in the cutting procedure is discharged by means of a pressure of nitrogen.

Alternatively, the predetermined angle is within a range of +45° to −45°.

Alternatively, the predetermined angle is within a range of −15° to −30°.

In another aspect, the present disclosure provides in one embodiment a laser drilling system, including:

a pulse laser outputting mechanism configured to output a pulse laser beam and scan a substrate to be drilled, so as to form a boundary cutting groove of a preformed hole;

a $CO_2$ laser outputting mechanism configured to output a $CO_2$ laser beam, align the $CO_2$ laser beam with a center of the preformed hole, and heat a substrate material of the preformed hole for a predetermined period of time; and a cooling mechanism configured to cool the substrate material of the preformed hole, so as to deform the substrate material and enable the substrate material to fall off from the substrate to be drilled.

Alternatively, the laser drilling system further includes: an air injection mechanism which includes an air-duct arranged along one of two opposite surfaces of the substrate to be drilled, and a nozzle arranged on the air-duct, and which is configured to blow air to or in-take air from the boundary cutting groove via the nozzle, so as to discharge a powder generated during a cutting procedure.

Alternatively, the pulse laser outputting mechanism is further configured to, after the substrate material of the preformed hole is cooled by the cooling mechanism, output a pulse laser beam and align the pulse laser beam with the preformed hole, so as to detect whether or not the substrate material has fallen off from the substrate to be drilled.

Alternatively, the laser drilling system further includes a detection mechanism configured to, after the substrate material of the preformed hole is cooled by the cooling mechanism and the pulse laser beam from the pulse laser outputting mechanism is aligned with the preformed hole, judge whether or not there is a spark from the preformed hole, if yes, determine that the substrate material has not fallen off from the substrate to be drilled, and if no, determine that the substrate material has fallen off from the substrate to be drilled.

Alternatively, the detection mechanism includes a CCD camera.

Alternatively, the pulse laser outputting mechanism, the $CO_2$ laser outputting mechanism, the cooling mechanism and the air blowing mechanism are integrated onto a working table, and controlled by a controller on the working table, respectively.

The embodiments of the present disclosure at least include the following advantageous effects. The substrate to be drilled is scanned with the pulse laser beam, and after the scanning, the substrate to be drilled is internally heated by means of the characteristic of the pulse laser beam, so as to form a series of continuous lines, which are then combined to form the boundary cutting groove of the preformed hole. In this way, a surface of the substrate to be drilled may be prevented from being damaged and a relatively large stress may not occur inside the substrate to be drilled. As a result, it is able to apply the laser drilling method and the laser drilling system of the present disclosure to drill a substrate with a high chemical intensity and to prevent the surface of the hole from being damaged seriously, thereby to ensure the surface quality of the hole. In addition, when the boundary cutting groove of the preformed hole is formed by the pulse laser beam, the $CO_2$ laser beam is used to heat the center of the preformed hole at a high temperature in a focusing manner, and then the substrate material is cooled rapidly, so as to enable the substrate material of the preformed hole to be deformed according to the principle of expansion and contraction and thereby fall off from the substrate to be drilled.

DETAILED DESCRIPTION

In order to make the objects, the technical solutions and the advantages of the present disclosure more apparent, the present disclosure will be described hereinafter in conjunction with the drawings and embodiments.

Figure 1:
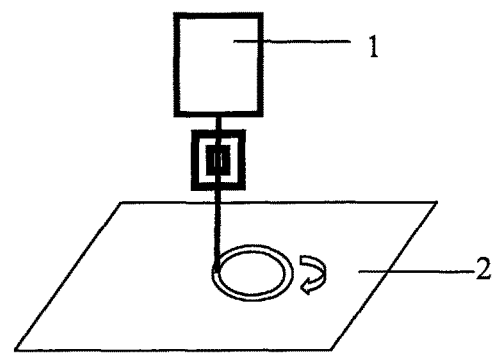
FIG. 1 is a schematic view showing the principle of a $CO_2$ laser drilling method in the related art
Figure 2:
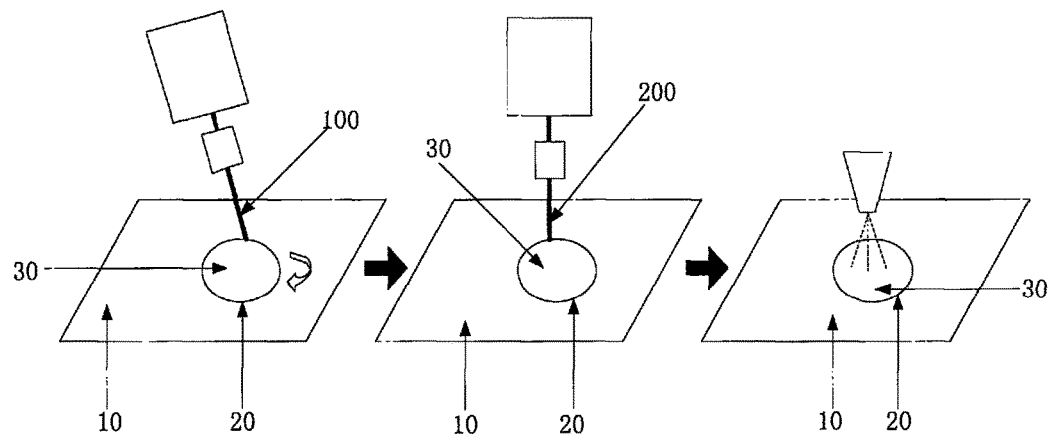
FIG. 2 is a schematic view showing the principle of a laser drilling method according to one embodiment of the present disclosure.

Referring to FIG. 2, which is a schematic view showing the principle of a laser drilling method according to one embodiment of the present disclosure, the laser drilling method includes:

a hole-boundary formation step of outputting a pulse laser beam 100 and scanning a substrate 10 to be drilled, so as to form a boundary cutting groove 20 of a preformed hole;

a material-in-hole heating step of outputting a $CO_2$ laser beam 200, aligning the $CO_2$ laser beam 200 with the preformed hole, and heating a substrate material 30 of the preformed hole for a predetermined period of time; and a hole formation step of cooling the substrate material 30 of the preformed hole, so as to deform the substrate material 30 and enable the substrate material 30 to fall off from the substrate 10 to be drilled.

According to the laser drilling method in this embodiment of the present disclosure, the substrate to be drilled is scanned by the pulse laser beam, and after the scanning, the substrate to be drilled is internally heated by means of the characteristic of the pulse laser beam, so as to form a series of continuous lines, which are then combined to form the boundary cutting groove of the preformed hole. In this way, a surface of the substrate to be drilled may be prevented from being damaged and a relatively large stress may not occur inside the substrate to be drilled. As a result, it is able to apply the laser drilling method and the laser drilling system of the present disclosure to drill a substrate with a high chemical intensity and to prevent the surface of the hole from being damaged seriously, thereby to ensure the surface quality of the hole. In addition, when the boundary cutting groove of the preformed hole is formed by the pulse laser beam, the $CO_2$ laser beam is used to heat the center of the preformed hole at a high temperature in a focusing manner, and then the substrate material is cooled rapidly, so as to enable the substrate material of the preformed hole to be deformed according to the principle of expansion and contraction and thereby fall off from the substrate to be drilled.

Figure 3:
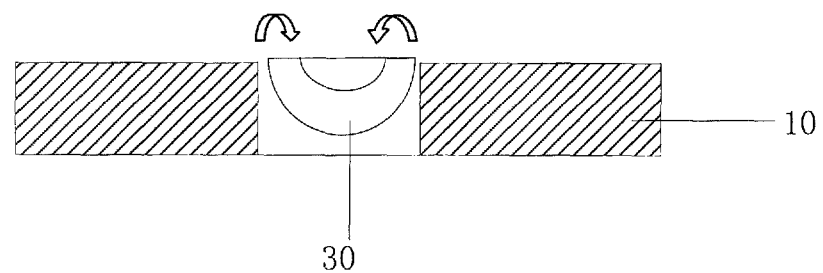
FIG. 3 is another schematic view showing the principle of the laser drilling method when a substrate material at a preformed hole is heated at a high temperature in a heat-aggregation manner and then cooled rapidly according to one embodiment of the present disclosure.

FIG. 3 is another schematic view showing the principle of the laser drilling method when the substrate material at the preformed hole is heated at a high temperature in a focusing manner and then cooled rapidly according to one embodiment of the present disclosure. Under the effect of expansion and contraction, the substrate material 30 of the preformed hole is bent upward at its periphery and depressed relative to the substrate 10 to be drilled in the middle, so that the substrate material 30 may fall off from the substrate 10 to be drilled successfully.

Alternatively, in the material-in-hole heating step, the $CO_2$ laser beam is aligned with a center of the preformed hole.

In one embodiment, the hole formation step of cooling the substrate material 30 of the preformed hole includes feeding a low-temperature gas (e.g., nitrogen) or liquid to the substrate material 30 of the preformed hole via a nozzle.

Optimally, as shown in FIG. 2, in the hole-boundary formation step of outputting the pulse laser beam 100 and scanning the substrate 10 to be drilled, the pulse laser beam 100 is angled at a predetermined angle relative to a line normal to the substrate 10 to be drilled, so that the pulse laser beam 100 can be focused in such a manner as to transmit through an entire thickness of the substrate 10 to be drilled. Alternatively, the predetermined angle is in a range from +45° and −45°, particularly from +15° to +30° or from −15 to −35°.

Figure 4:
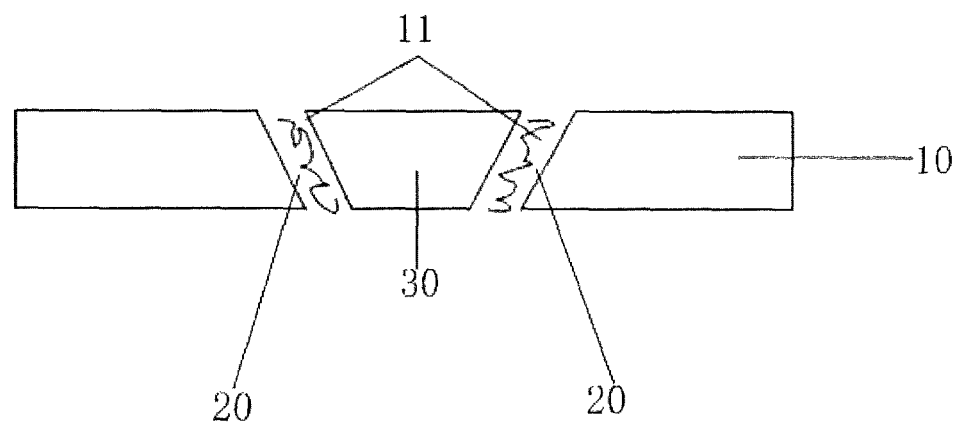
FIG. 4 is a schematic view showing the principle of the generation of a powder during the laser drilling.

It should be appreciated that, as shown in FIG. 4, during the laser drilling, a powder 11 may be generated in the boundary cutting groove 20, and it needs to be discharged in time. If no, the boundary cutting groove 20 may be blocked by the powder 11, and the substrate material 30 of the preformed hole cannot fall off from the substrate to be drilled successfully.

Alternatively, during the execution of the hole-boundary formation step, the material-in-hole heating step and the hole formation step, the laser drilling method further includes:

a powder discharging step of discharging, at a surface of the substrate 10 to be drilled, the powder generated during a cutting procedure by blowing air to or in-taking air from the boundary cutting groove 20 via a nozzle.

Figure 5:
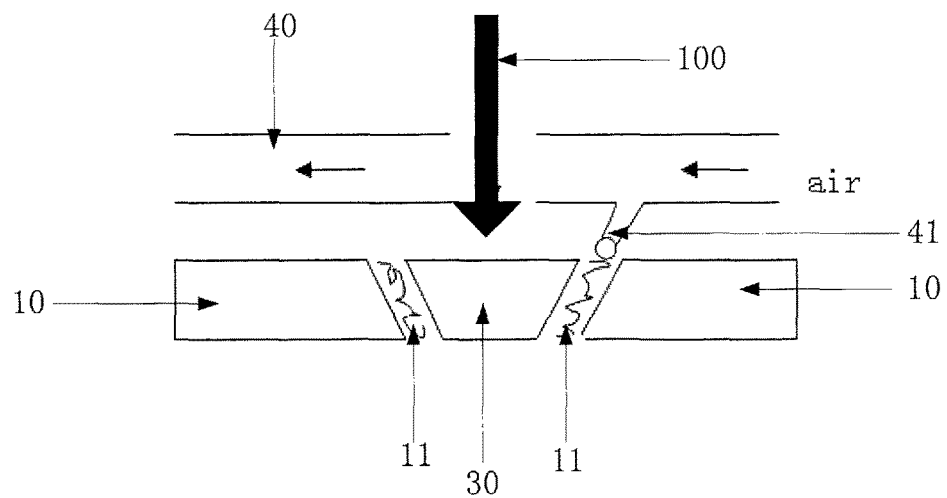
FIG. 5 is a schematic view showing the laser drilling method where the powder is discharged by a nozzle according to the first embodiment of the present disclosure.
Figure 6:
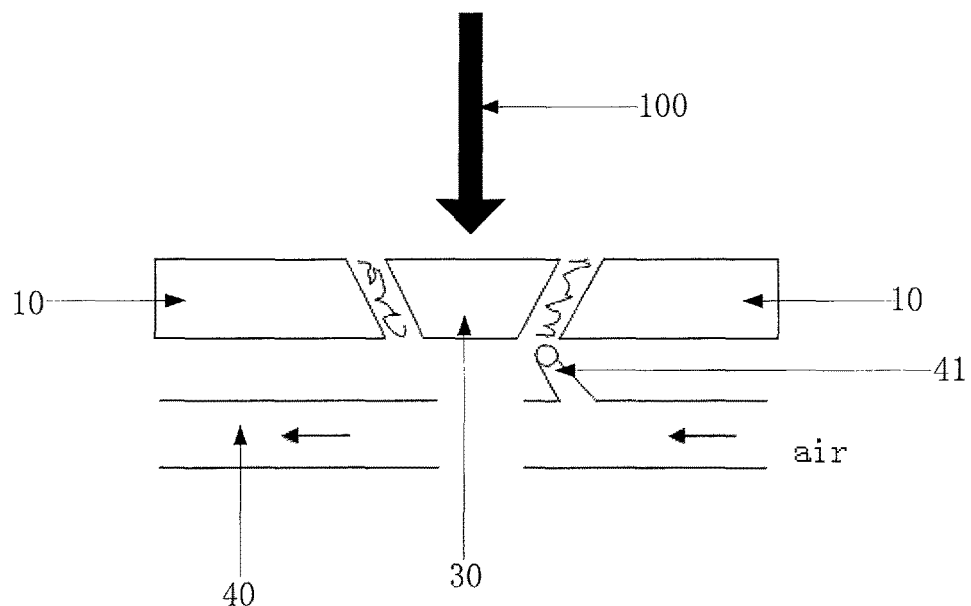
FIG. 6 is a schematic view showing the laser drilling method where the powder is discharged by the nozzle according to the second embodiment of the present disclosure.

FIG. 5 or 6 shows a structure of the nozzle. A powder discharging mechanism is arranged above or below the substrate 10 to be drilled, and it includes an air-duct 40 and a nozzle 41 in communication with the air-duct 40. The nozzle 41 blows air to or in-takes air from the boundary cutting groove 20, so as to discharge the powder 11 in the boundary cutting groove 20 under the effect of an air flow.

In addition, when the nozzle 41 is arranged above the substrate 10 to be drilled so as to blow air to the boundary cutting groove 20 and discharge the powder 11 in the boundary cutting groove 20 downward, it is able to further accelerate the discharging of the substrate material 30 from the substrate 10 to be drilled due to a downward force applied by the air from the nozzle 41 to the substrate material 30 of the preformed hole.

Further, in order to enable the air flow caused when the nozzle 41 blows or in-takes air to reach every position in the boundary cutting groove 20 of the preformed hole and thereby to ensure that the powder 11 in the entire boundary cutting groove 20 can be discharged completely, alternatively, a plurality of nozzles 41 in FIG. 5 or 6 is arranged at a regular interval around the boundary cutting groove 20.

Alternatively, the step of blowing air to or in-taking air from the boundary cutting groove 20 via the nozzle is performed in each of the hole-boundary formation step, the material-in-hole heating step and the hole formation step, or in one or two of these steps. For example, the step of blowing or in-taking air via the nozzle may be performed in the hole-boundary formation step and the material-in-hole heating step, while in the hole formation step, the gas for cooling the substrate material may also be used to discharge the powder.

Alternatively, apart from the hole-boundary formation step, the material-in-hole heating step and the hole formation step, the laser drilling method further includes:

a hole detection step of outputting a pulse laser beam, aligning the pulse laser beam with the preformed hole, judging whether or not there is a spark caused when the substrate material is being burnt from the preformed hole, if yes, determining that the substrate material has not fallen off from the substrate, and if no, determining that the substrate material has fallen off from the substrate.

It should be appreciated that, when a material is irradiated by the laser beam and then burnt, plasma is generated under the effect of the laser energy, and a spark occurs during the plasma transition. Based on this principle, when the preformed hole is irradiated with an invisible pulse laser beam and the substrate material in the preformed hole has fallen off from the substrate so as to form a through-hole, no spark will occur in the preformed hole, and when the substrate material in the preformed hole has not fallen off from the substrate completely, the spark will occur in the preformed hole as the substrate material is being burnt. When the preformed hole is irradiated with a visible pulse laser beam and the substrate material in the preformed hole has fallen off from the substrate so as to form the through-hole, a light beam with a certain color (red or green) will pass through the through-hole but no spark will occur, and when the substrate material in the preformed hole has not fallen off from the substrate completely, the spark will occur in the preformed hole as the substrate material is being burnt.

After the hole-boundary formation step, the material-in-hole heating step and the hole formation step, the pulse laser beam is outputted toward the center of the preformed hole again in the hole detection step, and whether or not the substrate material of the preformed hole has fallen off from the substrate completely may be determined by judging whether or not there is the spark in the preformed hole. When a plurality of holes is formed, each preformed hole is detected in this step, so as to determine whether or not the substrate material in each preformed hole has fallen off from the substrate completely. To be specific, after one preformed hole is formed by the hole-boundary formation step, the material-in-hole heating step and the hole formation step, the hole detection step is performed on the preformed hole. Alternatively, after a plurality of preformed holes are formed in the substrate by the hole-boundary formation step, the material-in-hole heating step and the hole formation step, the hole detection step is performed on each preformed hole. In addition, a laser outputting device for outputting the pulse laser beam in the hole detection step may be identical to, or different from, that in the hole-boundary formation step.

When there is the spark in the preformed hole and the substrate material has not fallen off from the substrate to be drilled completely, the nozzle may blow air into the preformed hole so as to enable the substrate material to fall off therefrom, or the above hole-boundary formation step, material-in-hole heating step and hole formation step may be performed on the preformed hole again.

In the embodiments of the present disclosure, the substrate to be drilled may be a glass substrate. However, the substrate is not limited thereto, and a substrate made of a metal or plastics may also be used.

The procedure of drilling the glass substrate with a laser beam using the laser drilling method of the present disclosure will be described hereinafter.

When a Soda-lime glass substrate with a thickness of 0.7 mm is to be drilled, in the hole-boundary formation step, the glass substrate is scanned with the pulse laser beam 100 having a power of 40 to 60 W and a frequency of 450 to 550 KHz, so as to form the boundary cutting groove 20 of the preformed hole.

In the material-in-hole heating step, the substrate material 30 of the preformed hole is heated with the $CO_2$ laser beam 200 having a power of 90 to 110 W and a frequency of 7 to 10 KHz. In the subsequent hole formation step, the substrate material 30 is cooled. Through the above steps, the procedure of drilling the Soda-lime glass substrate with a thickness of 0.7 mm is completed.

When a Dragontail glass substrate with a thickness of 0.7 mm is to be drilled, in the hole-boundary formation step, the glass substrate is scanned with the pulse laser beam 100 having a power of 40 to 45 W and a frequency of 450 to 550 KHz, so as to form the boundary cutting groove 20 of the preformed hole.

In the material-in-hole heating step, the substrate material 30 of the preformed hole is heated with the $CO_2$ laser beam 200 having a power of 90 to 110 W and a frequency of 7 to 10 KHz, and in the subsequent hole formation step, the substrate material 30 is cooled. Through the above steps, the procedure of drilling the Dragontail glass substrate with a thickness of 0.7 mm is completed.

A person skilled in the art should know how to determine parameters of the pulse laser beam and the $CO_2$ laser beam when the substrates made of different materials are to be drilled using the laser drilling method of the present disclosure, which will not be particularly defined herein.

In addition, the parameters of the pulse laser beam for judging whether or not the substrate material of the preformed hole has fallen off from the substrate in the hole detection step may be identical to, or different from, those of the pulse laser beam in the hole-boundary formation step, as long as the purposes may be achieved in these steps.

In the embodiments of the present disclosure, the mentioned preformed holes vary with a pore size, which depends on the machining requirements. The preformed hole refers to that obtained after the boundary is formed in the hole-boundary formation step but the substrate material in the hole has not fallen off from the substrate. In addition, as compared with the hole in which the substrate material has not fallen off from the substrate, the size of the through-hole obtained after the substrate material has fallen off from the substrate remains unchanged, so the preformed hole also refers to the through-hole obtained after the substrate material has fallen off from the substrate.

The present disclosure further provides in one embodiment a laser drilling system, including:

a pulse laser outputting mechanism configured to output a pulse laser beam and scan a substrate to be drilled, so as to form a boundary cutting groove of a preformed hole;

a $CO_2$ laser outputting mechanism configured to output a $CO_2$ laser beam, align the $CO_2$ laser beam with a center of the preformed hole, and heat a substrate material of the preformed hole for a predetermined period of time; and a cooling mechanism configured to cool the substrate material of the preformed hole, so as to deform the substrate material and enable the substrate material to fall off from the substrate to be drilled.

Alternatively, the laser drilling system further includes:

a powder discharging mechanism which includes air-ducts arranged along one of two opposite surfaces of the substrate to be drilled, and a nozzle arranged on each air-duct, and which is configured to blow air to or in-take air from the boundary cutting groove via the nozzle, so as to discharge a powder generated during a cutting procedure.

After the substrate material of the preformed hole is cooled by the cooling mechanism, the pulse laser outputting mechanism is further configured to output a pulse laser beam and align the pulse laser beam with the preformed hole, so as to detect whether or not the substrate material in the preformed hole has fallen off from the substrate to be drilled completely.

The laser drilling system further includes a detection mechanism configured to, after the substrate material of the preformed hole is cooled by the cooling mechanism and the pulse laser beam from the pulse laser outputting mechanism is aligned with the preformed hole, judge whether or not there is a spark from the preformed hole, if yes, determine that the substrate material has not fallen off from the substrate to be drilled, and if no, determine that the substrate material has fallen off from the substrate to be drilled.

Alternatively, the detection mechanism may be a CCD camera.

In the laser drilling system, the pulse laser outputting mechanism, the $CO_2$ laser outputting mechanism, the cooling mechanism and the air blowing mechanism are integrated onto a working table, and controlled by a controller on the working table, respectively.

According to the laser drilling method and the laser drilling system in the embodiments of the present disclosure, the substrate to be drilled is scanned with the pulse laser beam, and on the basis of the characteristic of the pulse laser beam, a surface of the substrate to be drilled may be prevented from being damaged and a relatively large stress may not occur inside the substrate to be drilled. As a result, it is able to apply the laser drilling method and the laser drilling system of the present disclosure to drill the substrate with a high chemical intensity and to prevent the surface of the hole from being damaged seriously, thereby to ensure the surface quality of the hole.

In addition, when the boundary cutting groove of the preformed hole is formed by the pulse laser beam, the $CO_2$ laser beam is used to heat the center of the preformed hole at a high temperature in a focusing manner, and then the substrate material is cooled rapidly, so as to enable the substrate material of the preformed hole to be deformed according to the principle of expansion and contraction and thereby fall off from the substrate to be drilled. The nozzle is provided to blow air to or in-take air from the boundary cutting groove, so as to discharge the powder in the boundary cutting groove in time and prevent the boundary cutting groove from being blocked. After the cutting procedure, the pulse laser beam is applied again and aligned with the preformed hole, so as to detect whether or not the substrate material in the preformed hole has fallen off from the substrate completely.

The above are merely the preferred embodiments of the present disclosure, but shall not be used to limit the present disclosure. A person skilled in the art may make further modifications and improvements without departing from the spirit and principle of the present disclosure, and these modifications and improvements shall also fall within the scope of the present disclosure.

What is claimed is:
1. A laser drilling method comprising:
a hole-boundary formation step of outputting a pulse laser beam and scanning a substrate to be drilled to internally heat the substrate to be drilled so as to form a series of continuous lines without damaging a surface of the substrate to be drilled, the series of continuous lines being combined to form a boundary cutting groove of a hole;
a material-in-hole heating step of outputting a $CO_2$ laser beam, aligning the $CO_2$ laser beam with the hole, and heating a substrate material of the hole for a predetermined period of time; and a hole formation step of cooling the substrate material of the hole, to deform the substrate material and enable the substrate material to fall off from the substrate to be drilled, wherein during executing the step of outputting the pulse laser beam and scanning the substrate to be drilled, the step of outputting the $CO_2$ laser beam and heating the substrate material of the hole for the predetermined period of time, and the step of cooling the substrate material of the hole immediately after heating, the method further comprises:

a powder discharging step of discharging, at a surface of the substrate to be drilled, a powder generated during a cutting procedure by taking air away from the boundary cutting groove via a nozzle.

2. The laser drilling method according to claim 1, wherein in the hole-boundary formation step of outputting the pulse laser beam and scanning the substrate to be drilled, the pulse laser beam is angled at a predetermined angle relative to a line normal to the substrate to be drilled.

3. The laser drilling method according to claim 2, wherein the predetermined angle is within a range of +45° to −45°.

4. The laser drilling method according to claim 3, wherein the predetermined angle is within a range of −15° to −30°.

5. The laser drilling method according to claim 1, further comprising:

a hole detection step of outputting a second pulse laser beam, aligning the second pulse laser beam with the hole, detecting whether or not there is a spark in the hole, if yes, determining that the substrate material has not fallen off from the substrate, and if no, determining that the substrate material has fallen off from the substrate, wherein the spark is caused by the substrate material irradiated by the second pulse laser beam.

6. The laser drilling method according to claim 5, wherein after one hole is formed by the hole-boundary formation step, the material-in-hole heating step and the hole formation step, the hole detection step is performed on the hole.

7. The laser drilling method according to claim 5, wherein when determining that the substrate material has not fallen off from the substrate, the method further comprises:

outputting a pulse laser beam and scanning the boundary cutting groove again;

outputting a $CO_2$ laser beam, aligning the $CO_2$ laser beam with the hole, and heating the substrate material of the hole again for a predetermined period of time; and cooling the substrate material of the hole again.

8. The laser drilling method according to claim 1, wherein in the step of in-taking air from the boundary cutting groove, a plurality of nozzles is arranged at a regular interval around the boundary cutting groove.

9. The laser drilling method according to claim 1, wherein in the material-in-hole heating step, the $CO_2$ laser beam is aligned with a center of the hole.

10. The laser drilling method according to claim 1, wherein the hole formation step of cooling the substrate material of the hole comprises feeding nitrogen to the substrate material of the hole.

11. The laser drilling method according to claim 1, wherein in the hole formation step, the powder generated in the cutting procedure is discharged by means of a pressure of nitrogen.

* * * * *